United States Patent [19]
Maeda et al.

[11] Patent Number: 5,133,538
[45] Date of Patent: Jul. 28, 1992

[54] TABLE FOR SECURING A PALLET SUPPORTING A WORKPIECE TO MACHINE TOOLS

[75] Inventors: Norihide Maeda, Kashiharashi; Hideki Okahashi, Ikomagun, both of Japan

[73] Assignee: Kabushiki Kaisha Mori Seiki Seisakusho, Yamatokoritamashi, Japan

[21] Appl. No.: 397,129

[22] Filed: Aug. 22, 1989

[30] Foreign Application Priority Data

Aug. 23, 1988 [JP] Japan .................. 63-209170

[51] Int. Cl.⁵ .............................. B23Q 7/10
[52] U.S. Cl. .................. 269/309; 29/33 P; 74/826; 409/219
[58] Field of Search ............ 29/33 P, 48.5 A; 409/205, 218, 219, 220, 225; 269/309; 74/831 L, 826

[56] References Cited

U.S. PATENT DOCUMENTS

| | | | |
|---|---|---|---|
| 2,672,675 | 3/1954 | Cross | 409/225 |
| 2,955,347 | 10/1960 | Zajac | 409/900.2 |
| 3,667,305 | 6/1972 | Rasoira | 74/813 L X |
| 4,015,487 | 4/1977 | Pfister | 74/813 L |

*Primary Examiner*—Z. R. Bilinsky
*Attorney, Agent, or Firm*—Antonelli, Terry, Stout & Kraus

[57] ABSTRACT

A table for securing a pallet supporting a workpiece to a machine tool, the table having a spindle movable in a vertical direction. When the spindle ascends, the clamp arms move outward thereby to enable the clamp pawl to clamp the pallet at a clamping position, and when the spindle descends, the clamp arms are withdrawn to release the pallet from clamp.

4 Claims, 6 Drawing Sheets

5,133,538

TABLE FOR SECURING A PALLET SUPPORTING A WORKPIECE TO MACHINE TOOLS

BACKGROUND OF THE INVENTION

The present invention relates generally to a table for use in association with machine tools, and, more particularly, to a table for releasably securing an automatic pallet supporting a workpiece to the machine tools.

Tables of the aforementioned type have been proposed wherein a pallet is clamped under a hydraulic pressure; however, the use of hydraulic pressure requires a hydraulic system and its attendant disadvantages. More particularly, by virtue of the use of a hydraulic system, the overall size of the machine is increased. Moreover, if a larger or greater force acts on the pallet which exceeds the hydraulic clamping force, the pallet is likely to "float" or move.

SUMMARY OF THE INVENTION

Accordingly, an object of the present invention is to provide a table for securing a pallet supporting a workpiece to the machine tool.

According to the present invention, there is provided a table for securing a pallet supporting workpieces to machine tools, the table comprising a spindle movable up and down, a driving means for moving the spindle in a vertical direction, the spindle comprising a plurality of clamp arms arranged radially thereof, means for operating the clamp arms, each arm including a clamp pawl movable radially of the spindle, connecting members freely connected to the clamp arms at one ends and to the arm operating means at the other ends, whereby the ascent of the spindle enables the clamp arms to move outward by a force given by the ascending spindle through the connecting members and enabling the clamp pawl to position at a place where the pallet is clamped, and become locked to the place by the connecting members, and whereby the descent of the spindle enables the clamp arms to withdraw to their original positions.

Other objects and advantages of the present invention will become more apparent from the following detailed description, when taken in conjunction with the accompanying drawings which show, for the purpose of illustration only, one embodiment in accordance with the present invention.

DETAILED DESCRIPTION OF THE PREFERRED EMBODIMENT

Figure 1:
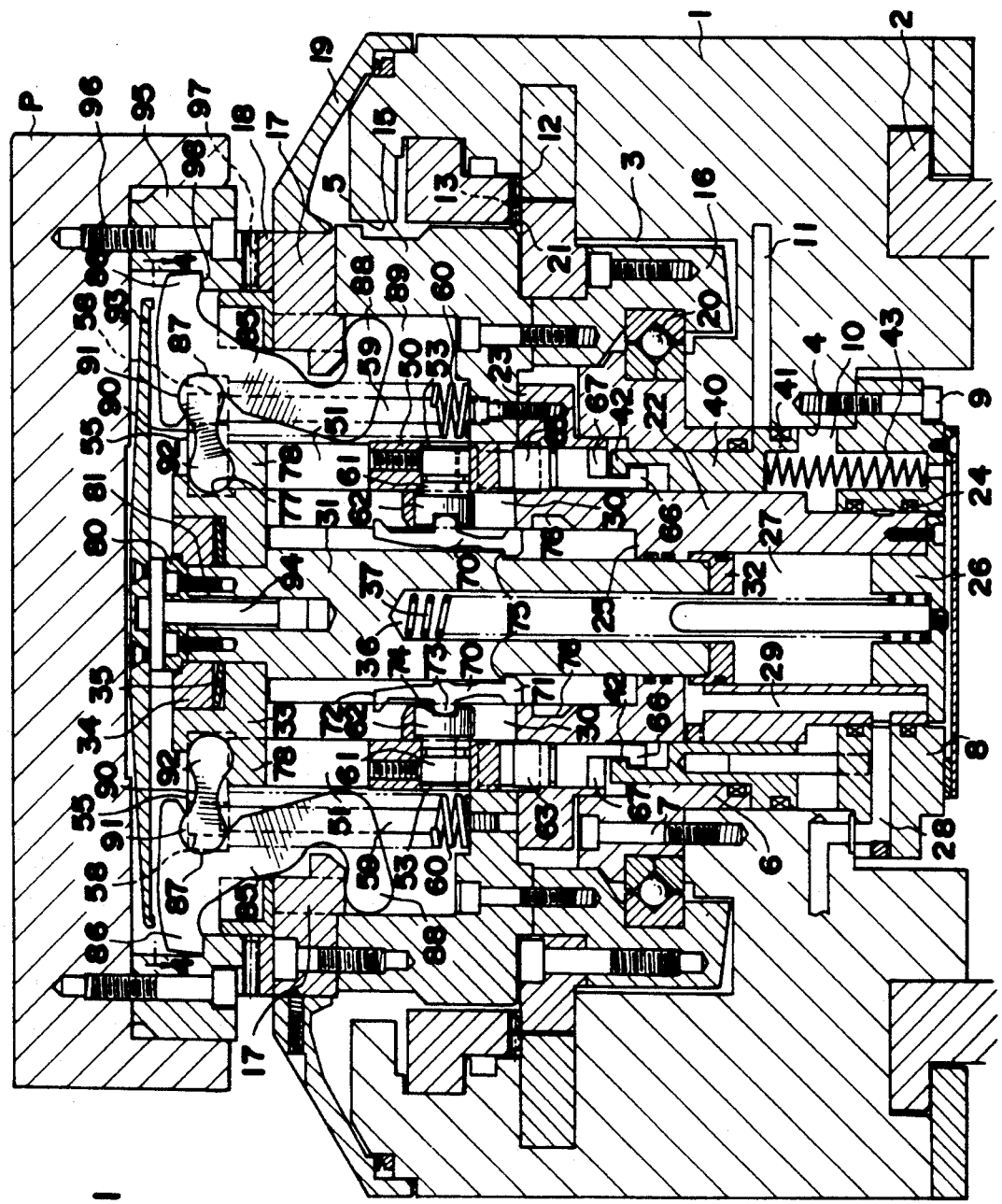
FIG. 1 is a cross-sectional front view showing a table according to the present invention, wherein a pallet is clamped by the table.

Referring now to the drawings wherein like reference numerals are used throughout the various views to designate like parts and, more particularly, to FIG. 1, according to this figure, a table 1 is placed on a bed of a machine such as, for example, a machining center, so as to be movable along guide rails 2 in a direction perpendicular to a plane of the drawings.

The table 1 includes a space 3 to accommodate a clamp portion of a pallet (P). The space 3 includes a lower opening 4 lined with a cylindrical wall member 6 by bolts 7, and surrounded with a bottom plate 8 by bolts 9. A hydraulic chamber 10 is formed between the wall member 6 and the bottom 8. The hydraulic chamber 10 is supplied with oil through a path 11.

The space 3 is also provided with an index coupling 12 on its inside wall, and a vertically movable coupling 13 is disposed in such a manner as to be engageable with the stationary index coupling 12. The movable coupling 13 is moved by a driving means (not shown) disposed near an upper opening 5 of the table 1.

A pallet base 15 is provided with a supporting block 16 in its lower section and a flange 17 in its upper section to support a clamping arm described below. The flange 17 is provided with couplings 18 erected in a circle on its top surface toward the pallet (P). A cover 19 is provided for covering the upper opening 5 of the table 1.

The supporting block 16 of the pallet base 15 is rotatable around the axis of the table 1 through bearings 20, and an index coupling 21 is fixed to the supporting block 16. A movable coupling 13 is engaged with the index coupling 21 and the coupling 12 of the table 1, thereby enabling the pallet base 15 to be fast at a desired indexed position.

A hydraulic cylinder 22 includes flange portion 23 fixed to the bottom of the pallet base 15 by bolts, and a lower end extending through the bottom plate 8 of the table 1 until its lower periphery contacts the inside wall of the bottom plate 8 through a seal ring 24.

The hydraulic cylinder 22 includes a ring-shaped step 25, and a hydraulic chamber 27 between the ring-shaped step 25 and a bottom member 26, with the hydraulic chamber 27 being supplied with oil through paths 28 and 29.

The hydraulic cylinder 22 includes long holes 30 in its upper section, with the holes 30 being diametrically opposed to each other and axially extending.

A spindle which 31 is movably inserted in the hydraulic cylinder 22 in contact with the inside wall of the ring-shaped step 25. The spindle 31 is fitted with another spindle 32 which moves in the hydraulic chamber 27.

The spindle 31 is provided with a pair of blocks 33, 34 through springs 35. The structure and function of the blocks 33, 34 will be described below:

The spindle 31 includes a bore 36 in which a spring 37 is inserted to urge the spindle 31 upward. The spring 37 is supported by the bottom plate 26.

A cylindrical piston 40 is fitted around a lower part of the hydraulic cylinder 22 so as to release the clamping pressure. The piston 40 includes a piston portion 41 in its lower section, and a ring-shaped shoulder 42. The piston portion 41 moves in the hydraulic chamber 10. The piston 40 is normally biased upward by a spring 43 disposed between the piston portion 41 and the bottom plate 8.

A pallet clamping ring 50 of a cylindrical form is fitted around an upper part of the cylinder 22 above its flange portion 23.

Figure 6:
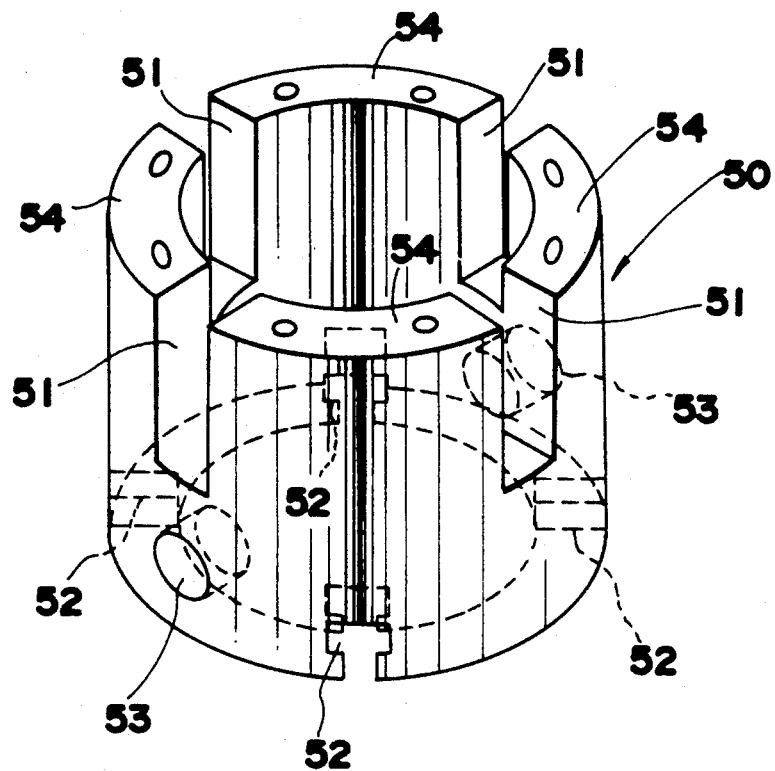
FIG. 6 is a perspective view showing a pallet clamping ring.

The clamping ring 50, as shown in FIG. 6, includes four slots 51 cut downward from its rim, the four slots 51 being spaced by an angular interval of 90°, and four T-shaped grooves 52 which are also spaced by an angular interval of 90°. The T-shaped grooves 52 are arranged to position between one slot and the next. A pair of holes 53 are diametrically located, below the adjacent slot 51 for allowing pins 61 to pass therethrough.

Figure 4:
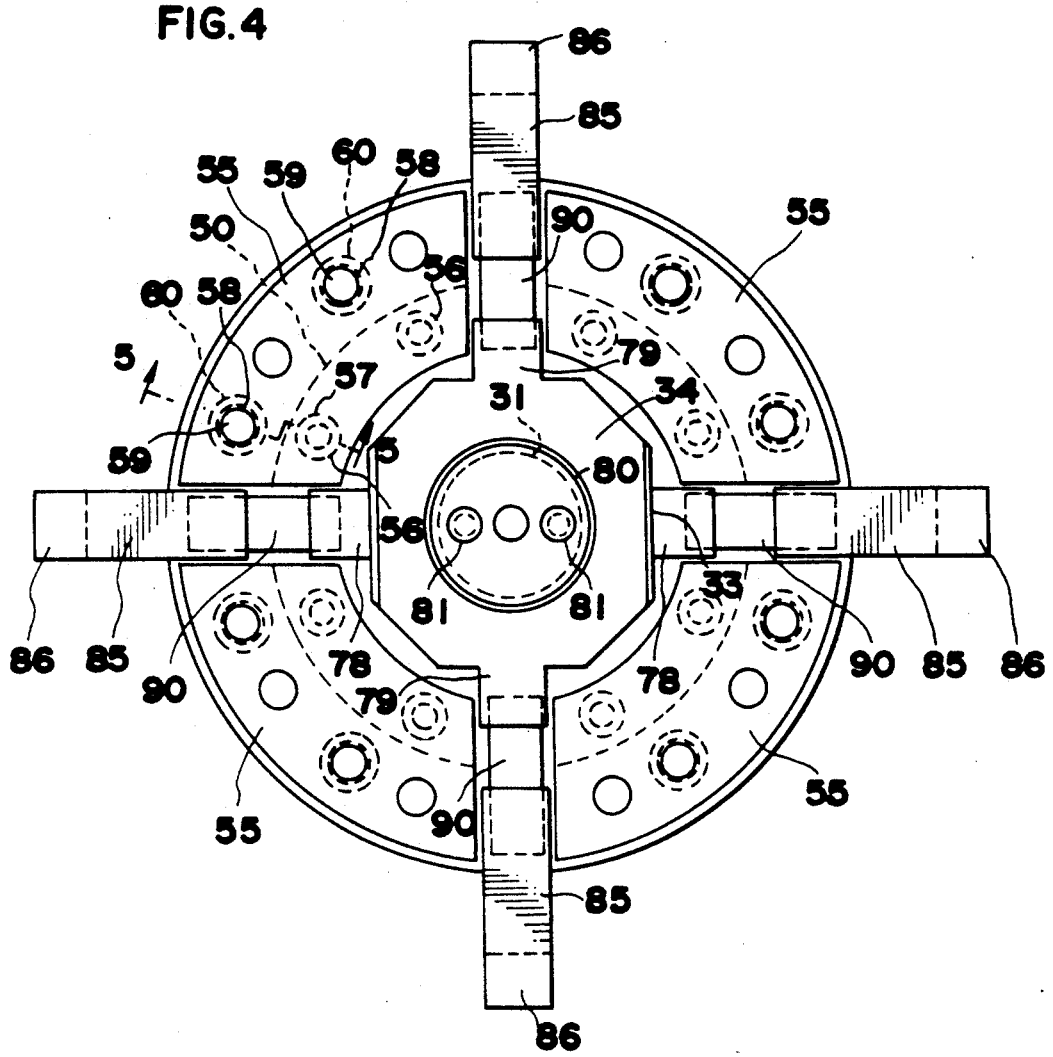
FIG. 4 is a cross-sectional view taken along 4—4 line in FIG. 1.
Figure 5:
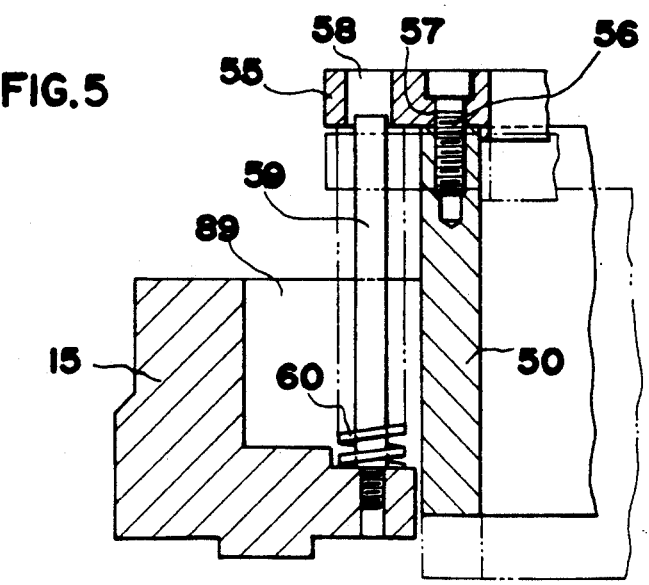
FIG. 5 is a cross-sectional view taken along 5—5 line in FIG. 4.
Figure 7:
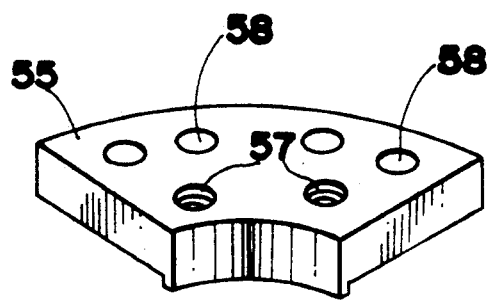
FIG. 7 is a perspective view showing a sector-shaped member.

In this way the clamping ring 50 is split into four wall components 54 between one slot 51 and the next. Each wall component 54 is provided with a sector-shaped member 55 shown in FIG. 7 fixed by means of bolts 56, as shown in FIGS. 4 and 5.

Each sector-shaped member 55 includes holes 58 for allowing guide post 59 to pass therethrough and threaded holes 57 for receiving fastening bolts 56.

The clamping ring 50 equipped with the sector-shaped members 55 is slidably fitted around the hydraulic cylinder 22. As best shown in FIG. 5, spring guide bars 59 erected on the bottom of the pallet base 15 are passed through the holes 58. The clamping rind 50 is biased upward by a spring 60 fixed to the spring guide bar 59.

The pins 61 are passed through the holes 53 such that the top portions 62 thereof are protruded inside the clamping ring 50 and fit in the long hole 30 of the hydraulic cylinder 22. In this way the clamping ring 50 is allowed to move vertically within the range limited by the long holes 30.

Figure 8:
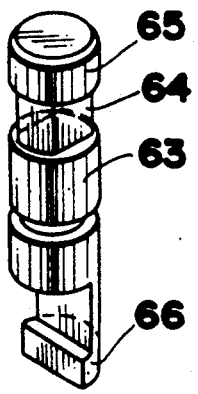
FIG. 8 is a perspective view showing an unclamping pin.

An unclamping pin 63 is fixed to a lower part of the clamping ring 50. As shown in FIG. 8, the unclamping pin 63 includes a head 65, a neck 64 and a leg 66. The unclamping pin 63 is fixed to the clamping ring 50 by inserting the head 65 and the neck 64 in the T-shaped grooves 52 (FIG. 6). Each clamping pin 63 passes through a hole 67 and extrudes downward until its leg 66 engages the ring-shaped shoulder 42 of the piston 40.

Figure 2:
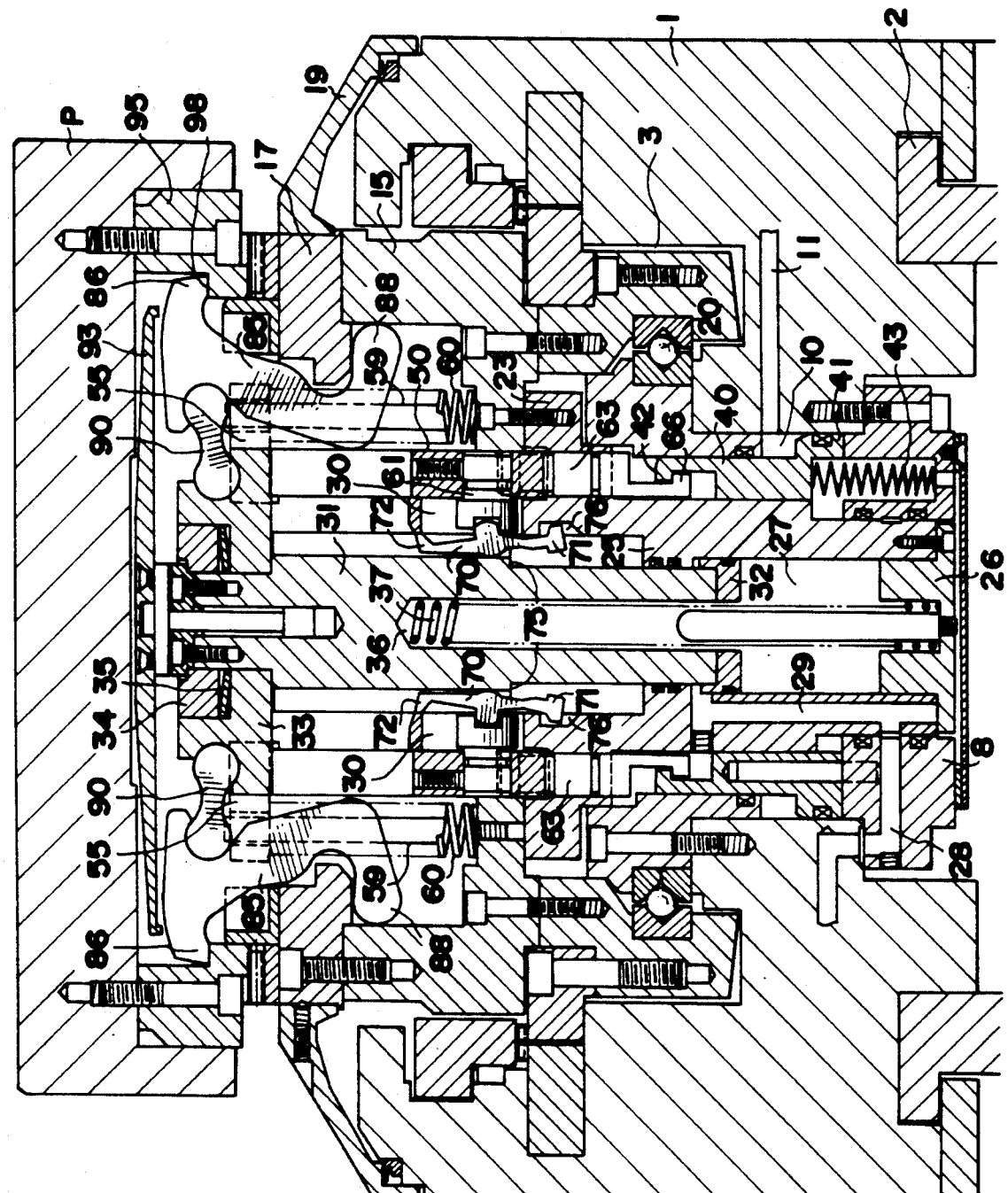
FIG. 2 is a cross-sectional front view showing a table of FIG. 1, wherein the clamping pressure released.
Figure 3:
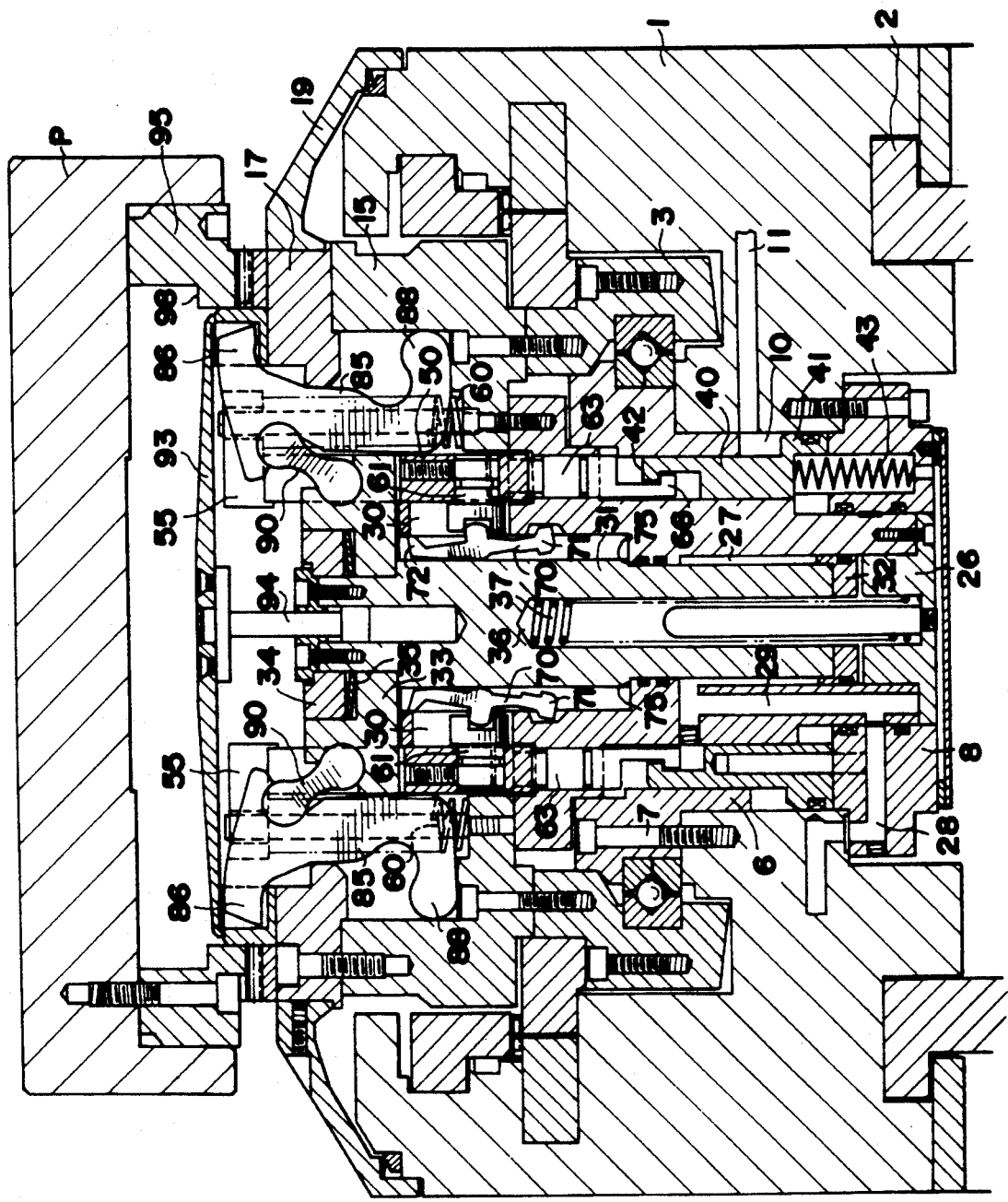
FIG. 3 is a cross-sectional front view showing a table in its unclamping state.

A movable engager 70 includes pawls 71 and 72 at opposite ends and a pivotal dowel 73 at its center. The dowel 73 fits in a recess 74 in the top portion 62 of the pin 61 so that the engager 70 oscillates about the dowel 73. When the clamping ring 50 is at a higher position, as shown in FIG. 1, the lower pawl 71 is engaged with a step 75 produced on the outside wall of the spindle 31. When the clamping ring 50 is at a lower position, as shown in FIGS. 2 and 3, the upper pawl 72 comes into abutment with a slant surface of the hydraulic cylinder 22, and is displaced inward. As a result, the lower pawl 71 is displaced outside and accommodated in a recess 76 produced on the inside wall of the hydraulic cylinder 22.

Figure 9:
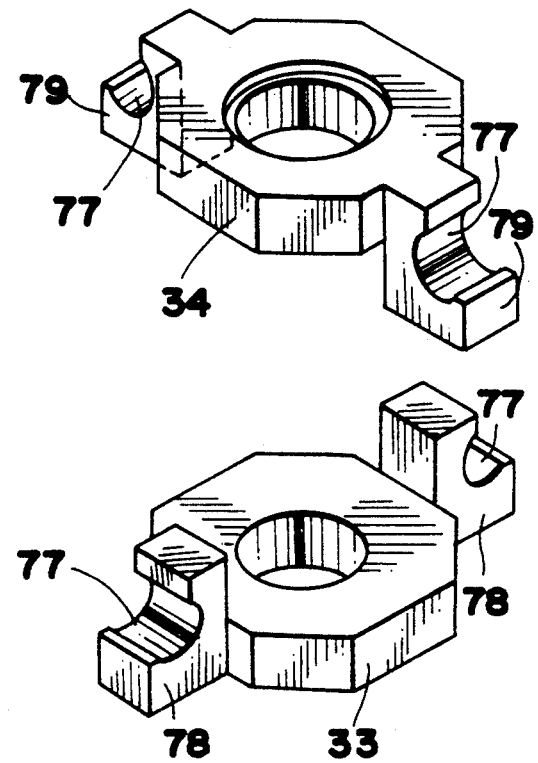
FIG. 9 is a perspective view showing an arm pressing block.

The blocks 33, 34 are shaped in the form of eight-sided figure as shown in FIG. 9, and respectively include horn members 78 and 79 diametrically arranged. Each horn member 78, 79 includes a semi-circular recess 77. Though the two blocks 33 and 34 take the similar form, they are different in their fixing position with respect to the respective body portions such that when the blocks 33 and 34 are joined face to face, they are in the same plane with the horn members 78 and 79 being angularly space by 90°. The facially joined blocks 33, 34 are fixed on the top end of the spindle 31 through the spring 35. The blocks 33 and 34 are maintained by bolts 81 through a presser plate 80 in such a manner as to be movable under the action of the spring 35. The movability of the blocks 33, 34 equalizes the clamping pressure by a plurality of clamp arm 85, which will be hereinafter described in greater detail. It is arranged that the pressure of the spring 35 is smaller than that of the spring 60 which urges the clamping ring 50 upward.

Figure 10:
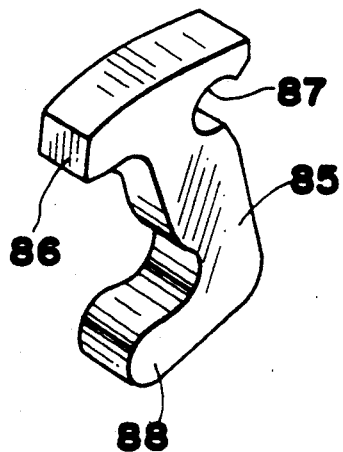
FIG. 10 is a perspective view showing a clamping arm.
Figure 11:
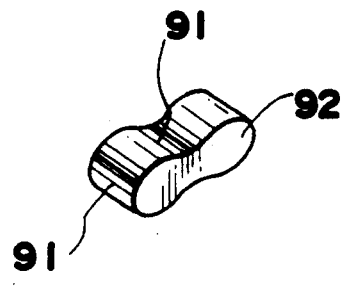
FIG. 11 is a perspective view showing a connecting member.

As shown in FIG. 10 a substantially J-shaped clamp arm 85 includes a hook-like clamping pawl 86, an engaging recess 87 at the back of the pawl 86, and an engager 88.

The clamp arms 85 are accommodated in a ring-shaped recess 89 formed between the pallet base 15 and the clamping ring 50, and located at places corresponding to the horn members 78 and 79. Each clamp arm 85 is supported by the sector-shaped members 55 at both sides and its engager 88 is held toward the engagement with the flange 17.

Each clamp arm 85 and the horn member 78 or 79 are connected by a connecting member 90 which includes projections 91 and 92 having a semi-circular cross-section at both ends. The projection 91 is engaged with the recess 87 of the clamp arm 85, and the other projection 92 is engaged with the recess 77 of the horn member 78 or 79. In this way the clamp arms 85 are rotatably connected to the blocks 33, 34 through the connecting members 90. In the clamping condition shown in FIG. 1 the connecting member 90 prevents the clamp arms 85 from moving to the unclamping position, and locks the clamp arms 85 to the clamping positions.

The clamp unit is covered by a cover 93 which is supported by a pin 94 vertically movable, and wholly covers the pallet base 15 in the unclamping condition.

The pallet (P) is fastened by a fastening ring 95 which is fixed to the bottom plate of the pallet (P) by bolts 96 and is provided with couplings 97 engageable with the couplings 18 of the pallet base 15. The fastening ring 95 is also provided with a ring-shaped step 98.

The table is operated as follows:

In FIG. 1 the pallet (P), placed on the pallet base 15, is prevented from turning because of its coupling 97 being engaged with the coupling 18. At this stage the pallet (P) is clamped by the pawls 86 of the clamp arms 85 which are engaged with the step 98. At a position where the pallet (P) is clamped the clamp arms 85 are maintained by the connecting members 90 which are biased upward by the springs 37 and 60. Once the clamp arms 85 are maintained at the clamping position, a strong clamping force is imparted to the arms 85 to guarantee that the pallet (P) retains its clamped state irrespective of an unexpected external force.

When the clamped pallet (P) is to be released or unclamped, the clamping force imparted by the springs 60 is released.

Oil is introduced into the hydraulic chamber 10 through the path 11 from a source (not shown), whereby the piston 40 is forced downward for the spring 43. In accordance with the downward movement of the piston 40 the unclamping pin 63 and the pallet clamp ring 50 are caused to descend against the spring 60. The descent of the clamp ring 50 causes the movable engagers 70 to descend through the pin 60, thereby releasing the lower pawl 71 from the step 75 of the spindle 31, and bringing the upper pawl 72 into abutment with an upper slant part of the cylinder 22. In this way the upper pawl 72 is displaced inward whereas the lower pawl 71 is displaced outward and accommodated in the recess 76. When the pawls 71 of the movable engagers 70 are disengaged with the step 75 of the spindle 31, the spindle 31 is released from the force provided by the spring 60, and the clamping force on the clamp arms 85 is also lost but they retain their clamping position under the action of the spring 37.

Then, oil is introduced into the hydraulic chamber 27 through the paths 28, 29, and as shown in FIG. 3, the table spindle 31 is caused to descend against the spring 37. In accordance with the descent of the spindle 31 the blocks 33 and 34 descend, thereby causing the connecting members 90 to descend. In this way the clamp arms 85 withdraw in radial directions, thereby enabling the pawls 86 to move to the unclamping position where they are separated from the step 98 of the pallet (P). The pallet (P) is ready for replacement.

At the unclamping position the cover 93 closes the opening of the pallet base 15. When the replacement of the pallets (p) takes place, the cover 93 and the covering plate 19 prevent cutting chips and used oil from intruding into the inside of the table 1.

When a fresh pallet (P) is to be clamped, the procedure is reversely followed. First, the oil in the hydraulic chamber 27 is discharged, thereby allowing the spindle 31 to rise up by the spring 37, and moving the clamp arms 85 to the clamping positions. Then, the oil in the chamber 10 is discharged, thereby allowing the piston 40 to return to the position shown in FIG. 1 by the spring 43. Simultaneously, the clamping pin 50 and the unclamping pin 63 are raised to the position shown in FIG. 1 by the spring 60 through the sector-shaped members 55. While they are rising, the lower pawls 71 of the movable engagers 70 are engaged with the step 75 of the spindle 31. In this way the raising force is imparted to the spindle 31. The raising force is transmitted to the clamp arms 85 through the blocks 33, 34 and the connecting members 90. Thus, the pawls 86 possess a clamping force.

What is claimed is:

1. A table for securing a pallet supporting workpieces to machine tools, the table comprising:
    a base means;
    a spindle movable relative to said base means in an ascending and a descending direction;
    a driving means for moving the spindle in a vertical direction;
    a plurality of clamp arms arranged radially of the spindle, each of said clamp arms including a clamp pawl member radially movable with respect to said spindle;
    means for operating the clamp arms; and
    connecting members each having a first end freely connected to the respective clamp arms and a second end connected to the means for operating the clamp arms, whereby, when the spindle is moved in the ascending direction, the clamp arms pivot, relative to the base means, by a force of the ascending spindle through the connecting members to cause the clamp pawl members to move downwardly to assume a clamping position in which the pallet is clamped and locked in place by the connecting members, and, upon the spindle being moved in the descending direction, the clamp arms are pivoted radially inwardly and moved downwardly to their original positions within said base means.

2. A table as set forth in claim 1, wherein the means for operating the clamp arms comprises a spring means for urging the spindle in the ascending direction, and hydraulic means for forcing the spindle in the descending direction against the force of the spring means.

3. A table for securing a pallet supporting workpieces to machine tools, the table comprising:
    a spindle moving in an ascending and descending direction;
    a driving means for moving the spindle in a vertical direction;
    a plurality of clamp arms arranged radially of the spindle, each of said clamp arms including a clamp pawl member radially movable with respect to said spindle;
    means for operating the clamp arms including a spring means for urging the spindle in the ascending direction, and a hydraulic means for forcing the spindle in the descending direction against the force of the spring means, the spring means comprises a first spring for raising the clamp arms to the clamping position, and a second spring for imparting a clamping force to the clamp arms positioned at the clamping position, the hydraulic means comprises a first hydraulic means for forcing the spindle in the descending direction against the force of the first spring, and a second hydraulic means for causing the second spring to release the clamping force acting upon the clamp arms; and
    connecting members each having a first end freely connected to the respective clamp arms and a second end connected to the means for operating the clamp arms, whereby, when the spindle is moved in the ascending direction, the clamp arms move radially outwardly by a force of the ascending spindle through the connecting member thereby enabling the clamp pawl members to assume a clamping position in which the pallet is clamped and locked in place by the connecting members, and, upon the spindle being moved in the descending direction, the clamp arms are returned to their original positions.

4. A table as set forth in one of claims 1, 2 or 3, further comprising a cover means disposed above the spindle for covering the table so as to prevent an intrusion of dust and used oil when the spindle is moved in the descending direction.

* * * * *